UNITED STATES PATENT OFFICE 2,310,867

COATING COMPOSITION

Earle C. Pitman, Red Bank, N. J., assignor to E. I. du Pont de Nemours & Company, Wilmington, Del., a corporation of Delaware No Drawing. Application February 25, 1941, Serial No. 380,456

6 Claims. (Cl. 106—195)

This invention relates to improved coating compositions, and more particularly to improved cellulose nitrate coating compositions which are substantially free from tendency to sag and streak when applied to vertical surfaces.

Although cellulose nitrate lacquers and enamels have for many years been widely used for general coating purposes with phenomenal success, certain problems, particularly as concerned with the application of such compositions in heavy coats to vertical surfaces to provide thick films with fewer applications, have not been solved in a completely satisfactory manner. This is particularly true in the well-known dipping application of coatings. Various means have been employed in an effort to obtain heavier, sag-free coatings without significant success. One means which has been used commercially is the slow withdrawal of an object from a coating bath of relatively high viscosity while maintaining an atmosphere of suitable solvent vapors around the coated object. This and other known expedients, however, leave much to be desired by way of increased film thickness for each coat with complete freedom from sagging tendencies.

This invention, therefore, has as a primary object the provision of a coating composition which may be applied to surfaces in heavier coatings with resultant greater thickness in the ultimate film than has heretofore been possible. Another object is the provision of a cellulose nitrate coating composition which may be applied to vertical surfaces at normal application viscosities with substantially complete elimination of sagging tendencies. Another object is the provision of a composition which affords greater uniformity in the final finish. A further object is the provision of a composition which eliminates streaking effects in the finish. Another object is the provision of a cellulose nitrate composition which may be conveniently and satisfactorily applied to an object by dipping processes. Other objects will appear as the description of the invention proceeds.

These objects are accomplished through the inclusion in a coating composition of dynamite type cellulose nitrate as an essential ingredient dissolved or dispersed in a liquid volatile vehicle containing at least one active solvent for the said cellulose nitrate and applying the coating compositions to an object at normal application viscosities.

The term "dynamite" nitrocellulose is intended to mean the type of nitrocellulose commonly used for explosives. It is characterized in its extremely high viscosity and gel structure in suitable solvents, e. g., acetone. It differs from low viscosity or even so-called 1000 seconds viscosity nitrocellulose by its gel structure or false body characteristic and by the lack of any intentional treatment in its manufacture to reduce its viscosity characteristic.

The following examples are given by way of illustration only and no limitations are intended thereby except as indicated in the appended claims:

*Example 1.—Conventional dipping lacquer*

| | Per cent by weight |
|---|---|
| Cellulose nitrate | 25.5 |
| Ethyl alcohol (denatured) | 23.0 |
| Dibutyl phthalate | 10.5 |
| Butyl acetate | 15.7 |
| Ethyl acetate (99.0%) | 3.8 |
| High solvency petroleum naphtha (B. R. 95°–135° C.) | 14.2 |
| High solvency petroleum naphtha (B. R. 135°–190° C.) | 7.3 |
| | 100.0 |

The cellulose nitrate used in this example had a viscosity characteristic of 3.4 seconds determined in accordance with A. S. T. M. specifications D–301–33.

The composition when reduced with a thinner composed of the solvent-diluent composition of the example in the proportion by weight of 4 parts of lacquer to 1 part of thinner had a normal dipping viscosity of 57 seconds in the Parlin #15 cup at 25° C. ("Paints, Varnishes & Lacquers," 9th ed., 1939, page 224, Henry A. Gardner).

*Example 2.—Modified dipping lacquer*

| | Per cent by weight |
|---|---|
| Cellulose nitrate (dynamite type) | 0.48 |
| Cellulose nitrate (viscosity—23 centipoises) | 25.02 |
| Ethyl alcohol (denatured) | 23.00 |
| Dibutyl phthalate | 10.50 |
| Butyl acetate | 15.70 |
| Ethyl acetate (99.0%) | 3.80 |
| High solvency petroleum naphtha (B. R. 95°–135° C.) | 14.20 |
| High solvency petroleum naphtha (B. R. 135°–190° C.) | 7.30 |
| | 100.00 |

The dynamite type cellulose nitrate used in this example was manufactured in accordance with methods well known in the art such as described in my co-pending application S. N. 380,455, filed February 25, 1941.

In one method cotton linters previously subjected only to a very mild digestion at atmospheric pressure to remove oils and fats are nitrated at a temperature of 0–5° C. for a period of about 30 minutes with a nitrating acid mixture of which the following is typical:

|  | Per cent |
|---|---|
| Nitric acid | 23.85 |
| Sulfuric acid | 56.91 |
| Nitrosyl sulfuric | 2.82 |
| Water | 16.42 |
|  | 100.00 |

The nitrogen content of this type of cellulose nitrate is usually between about 12.15 and 12.35%. It will be noted that care is taken in the manufacture of dynamite nitrocellulose to avoid any substantial reduction in viscosity characteristic or destruction of gel structure property of the cellulose or cellulose nitrate.

This type of cellulose nitrate has an exceptionally high viscosity characteristic and ordinarily cannot be dissolved in the common solvents and diluents in any considerable concentration. As an arbitrary (but necessary modification of A. S. T. M. specifications D–301–33) measure of the viscosity characteristic, the dynamite type cellulose nitrate of Example 2 was dissolved in acetone in the proportion of 3% by weight. This is because a 12.2% solution as required in the A. S. T. M. method cannot be prepared. The viscosity of the acetone solution determined in accordance with the modified falling ball (5/16" steel ball) method was 154 seconds. For comparison, a similar determination on a heavy dope type cellulose nitrate commonly used for coating purposes, which had a viscosity characteristic of 1090 seconds in Formula A of A. S. T. M. specifications D–301–33 had a viscosity of only 0.3 second for a 3% solution in acetone. If the viscosity of the dynamite cellulose nitrate is expressed in A. S. T. M. units calculated from the above determination, the viscosity characteristic is about 56,000 seconds.

The composition of Example 2, when reduced with a thinner composed of the solvent-diluent composition of the example in the proportion by weight of 4 parts of lacquer to 1 part of thinner, had a normal dipping viscosity of 52 seconds in the Parlin #15 cup at 25° C.

Wood blocks having several aluminum foil patches attached to the surface for more accurate measurement of final film thickness were dipped in the compositions of Examples 1 and 2 and withdrawn at the rate of 2 inches per minute. When the coatings had dried, it was found that the film thickness of the coating from Example 2 was 36% greater than that obtained from the Example 1 composition and, furthermore, no sagging with resultant non-uniformity in the finish was apparent. The test was repeated withdrawing the blocks at the rate of 8 inches per minute. In the case of the Example 1 composition, considerable sagging was observed, whereas this deleterious effect was completely absent in the composition of Example 2 when applied under identical conditions. Similarly also to the first test, the Example 2 composition provided a film of 31% greater thickness. Thus, although the compositions are identical in all respects, including solvent-diluent vehicle, total solids content proportion of cellulose nitrate and substantially identical in application viscosity, the only exception residing in the inclusion of a small amount of dynamite type cellulose nitrate, the results are unexpectedly and desirably different and clearly favor the modified composition.

*Example 3.—Conventional dipping lacquer*

|  | Per cent by weight |
|---|---|
| Cellulose nitrate | 12.0 |
| Ethyl alcohol (denatured) | 29.8 |
| Dibutyl phthalate | 5.0 |
| Butyl acetate | 20.4 |
| Ethyl acetate (99.0%) | 4.9 |
| High solvency petroleum naphtha (B. R. 95°–135° C.) | 18.4 |
| High solvency petroleum naphtha (B. R. 135°–190° C.) | 9.5 |
|  | 100.0 |

The cellulose nitrate in this example had a viscosity characteristic of 6.2 seconds determined in accordance with A. S. T. M. specifications D–301–33.

The composition when reduced with a thinner composed of the solvent-diluent composition of the example in the proportion by weight of 4 parts of lacquer to 1 part of thinner, had a normal dipping viscosity of 35 seconds in the Parlin #15 cup at 25° C.

*Example 4.—Modified dipping lacquer*

|  | Per cent by weight |
|---|---|
| Cellulose nitrate (dynamite type) | 1.05 |
| Cellulose nitrate (1/4" viscosity) | 10.95 |
| Ethyl alcohol (denatured) | 29.80 |
| Dibutyl phthalate | 5.00 |
| Butyl acetate | 20.40 |
| Ethyl acetate (99.0%) | 4.90 |
| High solvency petroleum naphtha (B. R. 95°–135° C.) | 18.40 |
| High solvency petroleum naphtha (B. R. 135°–190° C.) | 9.50 |
|  | 100.00 |

The dynamite type cellulose nitrate used in this example was from the same lot as that used in Example 2. The viscosity characteristic of the so-called 1/4" viscosity cellulose nitrate was 4.4 seconds as determined in accordance with A. S. T. M. specifications D–301–33, Formula C.

The composition of Example 4 when reduced with a thinner composed of the solvent-diluent composition of the example in the proportion by weight of 4 parts of lacquer to 1 part of thinner, had a normal dipping viscosity of 33 seconds in the Parlin #15 cup at 25° C.

As in the tests on Examples 1 and 2, wooden blocks carrying aluminum foil patches attached to the surface thereof were immersed in the compositions of Examples 3 and 4, and in one instance (a) withdrawn at the rate of 2 inches per minute and in another (b) at the rate of 8 inches per minute. In the first test (a), a film thickness of 0.55 mil was obtained with the composition of Example 3. Under the same conditions, the composition of Example 4 gave a final film thickness of 1.00 mil or almost double that obtained from the conventional type composition. A similar film thickness advantage was obtained in the second test (b) at the higher rate of withdrawal for the improved composition which gave a film thickness of 1.15 mils as compared to 0.63 mil for the conventional lacquer. In addition, the conventional lacquer exhibited sagging tendencies with resultant irregularities in the final finish.

Thus, the results secured in Examples 2 and 4 clearly demonstrate the decided advantage secured through the partial substitution of the regular coating type cellulose nitrate with dynamite type cellulose nitrate. Since all other composition and operating factors are held constant, the desirable improvements in film thickness and non-sagging effects can only be attributed to the presence of the small amount of dynamite type cellulose nitrate.

It will be noted that the viscosity of the blend of dynamite type cellulose nitrate and the low viscosity coating type cellulose nitrate shown in Examples 2 and 4 has been adjusted to conform to the viscosity of the regular coating type cellulose nitrates forming the sole cellulose nitrate ingredient of Examples 1 and 3. This is shown in the actual viscosity determinations of the ready to dip compositions. Thus, it is not the inherently high viscosity characteristic of the dynamite type cellulose nitrate which affords the new results but rather the unique property of this type of cellulose nitrate, when dissolved in a suitable solvent vehicle, which consists of a definite and critical yield point resembling that of those plastic materials or paints which sometimes exhibit "false body." It is probably this property which causes the composition to set up quickly on vertical surfaces without sagging to provide greater film thickness, thus differing in an important and fundamental way from other types of cellulose nitrate commonly employed for coating purposes. If a conventional high viscosity cellulose nitrate which does not possess this false body is used in place of the dynamite type cellulose nitrate at a concentration sufficiently high to give an equivalent apparent viscosity in the vehicle, sagging tendencies are encountered.

The amount of dynamite type cellulose nitrate which may be used may be varied over a considerable range depending upon the particular use of the composition containing it. For example, as described in my co-pending application, S. N. 380,455, filed February 25, 1941, I may use this type of cellulose nitrate as the sole cellulose nitrate ingredient in proportions up to 3% by weight of the liquid vehicle in the preparation of coatings for luminescent tubes and for ceramic ware where it is desired to keep the pigment content high and the non-volatile portion of the vehicle carrying the pigment at a minimum. For general coating purposes, however, where it is desired to provide a decorative or protective finish, it is ordinarily advantageous to maintain a high cellulose nitrate content in the vehicle. It is preferred to blend a small amount of dynamite type cellulose nitrate with ordinary coating type cellulose nitrate to provide the so-called "false body" effect without materially departing from the usual solids content and ultimate apparent viscosity of the coating composition.

In operating under the present invention, it is usually advisable to have at least 2% of the total nitrocellulose in the form of the dynamite type nitrocellulose. In compositions containing substantially less than 2%, the maximum build without sagging cannot be realized. On the other hand, if more than 20% of the total nitrocellulose is of the dynamite type, it is difficult to formulate dipping lacquers which will have satisfactory build. The viscosity characteristic of the nitrocellulose other than the dynamite type may vary within wide limits. In every case the maximum improvement in build and freedom from sagging are obtained with blends having the highest proportion of dynamite type nitrocellulose to ordinary nitrocellulose to obtain desired ultimate viscosity of the blend. In general, it is preferable that the ordinary nitrocellulose should not have a lower viscosity than ⅛ sec. in order to avoid undesirable brittleness in the films deposited from the blend.

In any event the invention contemplates the use of dynamite type cellulose nitrate in coating compositions as an essential ingredient and this material should be present in sufficient amount to provide the "false body" effect previously referred to. The amount needed for any particular purpose can be readily determined by those skilled in the art by making a few simple tests according to the teachings herein set forth.

The compositions are not limited with respect to solvents and diluents since other liquid volatile materials of the type illustrated in the examples including organic esters and ketones such as ethyl acetate, acetone, methyl ethyl ketone and diluents such as butyl alcohol, toluol, etc., may be used provided sufficient active solvent is present to afford complete solution of the cellulose nitrate. The new compositions may also include conventional cellulose nitrate plasticizers and natural and synthetic resins. Pigments and other coloring matter may also be incorporated if desired.

The compositions which are importantly useful for general coating purposes may be applied to objects and surfaces by any of the conventional means including dipping, brushing, spraying roller-coating and casting although they are of particular merit in dip applications, such as is commonly employed in the finishing of brush handles and the like.

Several advantages characterize the new compositions. Of primary importance is the much greater ultimate film thickness resulting from each coating application of the improved compositions, thus affording desirable operating and material economies. The compositions provide a superior quality finish since sagging tendencies with resultant streaking and irregularities in the finish are eliminated. Because of greater ultimate film thickness from each coating application, for many purposes a single coating may suffice, whereas with conventional coatings of like solids content two or more coatings would be required because of excessive drainage from vertical surfaces such as is encountered in dipping processes.

It is apparent that many widely different embodiments of the invention may be made without departing from the spirit and scope thereof; and, therefore, it is not intended to be limited except as indicated in the appended claims.

I claim:

1. An improved coating composition adapted for dipping comprising a plurality of film-forming ingredients one of which is dynamite type cellulose nitrate as an essential ingredient, and a liquid volatile vehicle containing at least one active solvent for the film-forming ingredients, the said dynamite type cellulose nitrate being present in amount less than 3 per cent of the total composition.

2. The composition of claim 1 in which one of the film-forming ingredients is dynamite type cellulose nitrate and another is low viscosity cellulose nitrate, the former being present in amount between about 2 per cent and 20 per cent of the total cellulose nitrate present.

3. An improved coating composition comprising dynamite type cellulose nitrate as an essential ingredient, cellulose nitrate having a viscosity characteristic of about 23 centipoises, and a liquid volatile vehicle containing at least one active solvent for the cellulose nitrates.

4. An improved coating composition comprising dynamite type cellulose nitrate as an essential ingredient and cellulose nitrate having a viscosity characteristic of about 23 centipoises in the proportion of about one part by weight of dynamite type cellulose nitrate to about 50 parts by weight of cellulose nitrate having a viscosity characteristic of 23 centipoises and a liquid volatile vehicle containing at least one active solvent for the cellulose nitrates.

5. An improved dipping lacquer comprising dynamite type cellulose nitrate as an essential ingredient, cellulose nitrate having a viscosity characteristic of about 4.4 seconds, A. S. T. M. specifications D-301-33, Formula C, and a liquid volatile vehicle containing at least one active solvent for the cellulose nitrates.

6. An improved coating composition comprising dynamite type cellulose nitrate as an essential ingredient and cellulose nitrate having a viscosity of about 4.4 seconds, A. S. T. M. specifications D-301-33, Formula C, in the proportion of about 1 part by weight of dynamite type cellulose nitrate to about 10 parts by weight of cellulose nitrate having a viscosity characteristic of about 4.4 seconds, A. S. T. M. specifications D-301-33, Formula C, and a liquid volatile vehicle containing at least one active solvent for the cellulose nitrates.

EARLE C. PITMAN.